(12) United States Patent
Blasi

(10) Patent No.: US 6,423,763 B1
(45) Date of Patent: Jul. 23, 2002

(54) UV AND WATER-RESISTANT INK OR CHINA INK

(76) Inventor: Ulrich Blasi, Institutstrasse 24, Munich (DE), 81241

( * ) Notice: Subject to any disclaimer, the term of this patent is extended or adjusted under 35 U.S.C. 154(b) by 0 days.

(21) Appl. No.: 09/581,863

(22) PCT Filed: Oct. 19, 1999

(86) PCT No.: PCT/EP99/07916

§ 371 (c)(1),
(2), (4) Date: Jun. 19, 2000

(87) PCT Pub. No.: WO00/23532

PCT Pub. Date: Apr. 27, 2000

(30) Foreign Application Priority Data

Oct. 20, 1998 (DE) .......................................... 198 48 273

(51) Int. Cl.$^7$ .......................... C09D 11/10; C09D 11/16; C09D 11/18
(52) U.S. Cl. ................... 523/161; 523/160; 106/31.27; 106/31.36; 106/31.57
(58) Field of Search ................................ 523/160, 161; 106/31.27, 31.28, 31.57, 31.6, 31.85, 31.36

(56) References Cited

U.S. PATENT DOCUMENTS

| | | | |
|---|---|---|---|
| 4,225,475 A | * 9/1980 | Carumpalos | 524/394 |
| 5,288,160 A | 2/1994 | Li et al. | |
| 5,611,847 A | * 3/1997 | Guistina et al. | 106/31.43 |
| 5,667,572 A | * 9/1997 | Taniguchi et al. | 106/31.36 |
| 5,837,042 A | * 11/1998 | Lent et al. | 106/31.14 |
| 6,086,197 A | * 7/2000 | Kubota et al. | 347/96 |
| 6,145,977 A | * 11/2000 | Natsuhara et al. | 347/100 |
| 6,160,034 A | * 12/2000 | Allison et al. | 523/161 |
| 6,204,307 B1 | * 3/2001 | Miyabayashi et al. | 523/160 |
| 6,286,953 B1 | * 9/2001 | Takemoto et al. | 347/100 |

FOREIGN PATENT DOCUMENTS

| | | |
|---|---|---|
| EP | 0 587 291 A1 | 7/1993 |
| EP | 0 818 518 A 2 | 1/1998 |

OTHER PUBLICATIONS

Merriam–Webster's Collegiate Dictionary 10$^{th}$ Ed.; Merriam–Webster Inc., Springfield, MA (p. 592), 1997.*

* cited by examiner

Primary Examiner—Vasu Jagannathan
Assistant Examiner—Callie E. Shosho
(74) Attorney, Agent, or Firm—Stephen B. Salai, Esq.; Brian B. Shaw, Esq.; Harter, Secrest & Emery LLP

(57) ABSTRACT

Novel colored liquids such as inks for use in fiber-tip, felt-tip, ballpoint and fountain pens and in ink-jet printing. The colored liquids contain by volume (I) 17.3 to 23.8% of a base ink; (II) 39.7 to 52.9% of an aqueous dispersion of a thermoplastic and self-crosslinking acrylic polymer serving as a vehicle and UV filter; (III) 4.7 to 5.8% of ethanol; (IV) 20.6 to 21.7% of water; (V) 2.6 to 6.6% of a basic auxilliary; and (VI) 2.6 to 6.6% of maple syrup thickener.

11 Claims, No Drawings

UV AND WATER-RESISTANT INK OR CHINA INK

The present invention relates to non-pigmented UV and water-fast colored liquids for fiber-tip, felt-tip and ball-point pens, fountain pens as well as for ink-jet printing. More particularly the invention relates to fountain pen inks or India inks. Furthermore, the invention relates to pigmented UV and water-fast colored liquids for fiber-tip, felt-tip pens as well as for fountain pens and ink-jet printing.

Inks and India inks are generally termed colored liquids greatly differing in composition and in the fields and nature of their applications. Writing liquids containing aqueous, dissolved dyes and vehicles, termed inks, are known since ancient times. India inks by contrast contain significantly more vehicles than inks as well as predominantly colored pigments and serve mainly as drawing liquids.

Inks today still make use of dyes such as aniline blue, armarine, Bismarck brown, rhodamine, fuchsine, phthalocyanine derivatives, methylene blue, malachite green, crystal violet, acid green, light blue, eosine, ponceau, water blue. Aniline blue derivatives, such as ink blue, are added to the ferro-gallic inks, the conventional fountain pen inks.

Pure dye inks containing in addition to the dye also thickeners such as sugar, dextrine etc. and stabilizers such as formaldehyde and phenol often include polyethylene glycol and water to enhance the flowability.

For marking packages and the like new techniques have been developed which necessitate other ink compositions, the most prominent example of which is in ink-jet printing. However, also other developments in the writing field have resulted in changes in the writing media. The invention of the ball-point and fiber-tip pen or combinations thereof, the ink ball-point pen, have resulted in novel inks, some of which are common to conventional writing liquids only by name.

The fountain pen inks mostly employed nowadays in ink cartridges make use of pure dye inks. Of the many available colors blue, black, green and red it is the color blue that is most prominent. The coloring component of blue ink is normally ink or water blue, a triarylmethane dye. The fountain pen inks also contain minor amounts of surfactants, these likewise being mixed with a solution of rubber arabicum as a tackifier.

In addition inks need to be stabilized with such agents as phenol. To improve the flow properties of fountain pen ink humectants such as glycerine, glycol or sorbit, etc are usually added to the ink.

Ball-point pens as used today employ dye pastes having a viscosity of 10 to 20 Pas at 20° C. and surface tensions of 40 mN/m to prevent the paste from running or seeping out from the ball gap. Most of the ball-point pastes commercially available are sufficiently resistant to water but not to ultraviolet light.

Fiber-tip pens, wrongly termed felt-tip pens nowadays, write with liquid ink. Common to fiber-tip pen inks is a low viscosity (less than 4 mPas at 25° C. and a low surface tension of approx. 30 mN/cm at 25° C.).

Aqueous fiber-tip pen inks contain 10 to 30% of a humectant such as glycol or polyglycols.

Pigmented inks are characterized by good body and high light fastness of the markings.

With inks suitable for use in the ink-jet printing it is important that these contain no particles having a diameter exceeding a micrometer. They must not dry out at the nozzle orifice when static and must not encrustate the nozzle with time. The parameters important for inks suitable for use in the ink-jet printing are viscosity, surface tension, condctivity and pH.

India inks generally constitute aqueous dispersions of carbon black to which primarily polyvinyl alcohol, methyl cellulose, hydroxyethyl cellulose are added as the protective colloid. For stabilization such stabilizers as, for example, phenol etc. are added.

Colored India inks are available either dense or clear, the former containing suitable organic or anorganic pigments.

However, all known inks or India inks have the disadvantage that they are resistant to neither ultraviolet light nor water.

It is thus the object of the present invention to provide non-pigmented as well as pigmented UV and water-resistant colored liquids, especially suitable for use in fiber-tip, felt-tip and ball-point pens as well as in fountain pens with the intention of these colored liquids or inks also being suitable for use in ink-jet printing when correspondingly adapted in viscosity and surface tension.

This object is achieved by the non-pigmented UV and water-fast colored liquid as set forth in claim 1 constituting an aqueous suspension or solution of dyes, vehicles as well as usual auxiliaries and additives. The colored liquid, ink or India ink in accordance with the invention contains, as constituents:

(I) 17.3 to 23,8, more particularly 19.8% by vol. base ink or India ink solution;

(II) 39.7 to 52.9, more particularly 46.3% by vol. of an aqueous dispersion of thermoplastic and self-crosslinking acrylic polymers serving as vehicle and UV filter, more particularly, Plextol® which is such a dispersion containing 49–51% solids by weight, and further containing an anionic emulsifier system.

(III) 4.7 to 5.8, more particularly 5.3% by vol. ethanol;

(IV) 20.6 to 21.7, more particularly 21.2% by vol. water;

(V) 2.6 to 6.6, more particularly 3.9% by vol. of a basic auxiliary;

(VI) 2.6 to 6.6, more particularly 3.3% by vol. thickener, more particularly maple syrup.

In addition the above object is achieved by a pigmented UV and water-fast colored liquid containing the following constituents;

(I) 19.3 to 27.1, more particularly 23.2% by vol. of a base pigment or ink solution;

(II) 41.8 to 51.1, more particularly 46.5%by vol. of an aqueous dispersion of thermoplastic and self-crosslinking acrylic polymers serving as vehicle and UV filter, more particularly Plextol®;

(III) 3.4 to 4.2, more particularly 3.8% by vol. ethanol;

(IV) 15.1 to 15.8, more particularly 15.5% by vol. water;

(VIII) 7.7 to 10.8, more particularly 9.3% by vol. of a dye concentration;

(IX) 1.4 to 1.7, more particularly 1.5% by vol. of a defoamer.

The added basic auxiliary (V) may be selected from the group comprising sodium hydrogen carbonate, sodium carbonate and potassium carbonate, preference being given to sodium hydrogen carbonate, a 70% solution of which is employed in accordance with the invention.

Acetic acid is added to the maple syrup used as the thickener to permit compounding with the self-crosslinking acrylic polymer, more particularly Plextol®.

To adjust for the necessary viscosity the colored liquids or inks in accordance with the invention may be thinned with water and/or alcohol. For fiber-tip pen inks it is particularly necessary to adjust for a low viscosity of less than 4 mPas at 25° C. and surface tensions of approx. 30 mN/cm at 25°

C. This is why small amounts of surfactants are added to the inks. In addition stabilizers may be added to the non-pigmented and pigmented colored liquids in accordance with the invention, the base ink solution (I) and (VII) respectively thus containing amounts of a stabilizer up to 0.5% by weight of preferably phenol or formaldehyde.

The viscosity of ball-point pen pastes is usually set in the range 10 to 20 Pas at 20° C., use being made, more particularly, of polyvinyl pyrrolidone as the thickener to attain viscosities of 40 mN/m.

It has been surprisingly discovered that unlike prior art inks the non-pigmented or pigmented inks in accordance with the invention are highly resistant to both ultraviolet light and water. It has also been found out that the inks in accordance with the invention exhibit an excellent resistant to acids: on paper in accordance with DIN 16554 (document paper) the sample non-pigmented ink as set forth in claim 1 is resistant to acids and satisfies the DIN requirement with no change in color, whereas the prior art ink made by Edding AG changed in color from a brilliant red to a dull, flat orange red.

The invention will now be detailed by way of the following examples, it being understood that the invention is in no way restricted thereto:

EXAMPLE 1

Procedure for Producing a Non-pigmented UV and Water-fast Ink in Accordance with the Invention Firstly 35 ml Plextol® (Plextol is a registered commercial product of Röhm, Darmstadt) acting as a vehicle and UV filter, was stirred with 16 ml water and 4 ml ethanol (100%) in a beaker. In a second beaker the base ink (I) was aggregated with 3 ml of a 70% solution of sodium hydrogen carbonate and with 2 ml maple syrup and stirred for approx. 10 minutes. The two solutions were then mixed together to produce the finished non-pigmented ink in accordance with the invention. To adapt the viscosity this ink solution may be further diluted with water.

The composition of the base ink (I) including the water blue dye was as follows:

17.0 g humectant 2.5 g sulphuric acid (94 to 95%)

5 g water blue, 0.1 g tenside 0.5 g stabilizer balance water (filled to one kilogram).

The base ink (I) was produced as follows: the humectant, usually glycerine or sorbit, was diluted in water, sulphuric acid added and the dye then stirred into the mixture. The resulting liquid was heated to 80° C. and stirred until the dye had completely dissolved. After cooling, the tenside and the phenol stabilizer were added to produce the solution ready for use.

EXAMPLE 2

Procedure for Producing a Pigmented Ink in Accordance with the Invention (neon ink)

Firstly the vehicle Plextol® (60 ml), 5 ml ethanol (100%)) and 20 ml water were stirred together in a beaker. Then the dye concentration (VII) (12 ml) (commerical product of Meteor, Netherlands) as well as the defoamer 1-propanol (70%) were added. Further stirring for approx. 10 minutes produced the colored liquid in accordance with the invention.

What is claimed is:

1. A non-pigmented UV and water-fast colored liquid for fiber-tip, felt-tip and ball-point pens, fountain pens as well as for ink-jet printing, comprising an aqueous solution or suspension of dyes, vehicle, stabilizers, auxiliaries and additives, characterized in that the colored liquid contains, as constituents:

(I) 17.3 to 23.8% by vol. base ink;

(II) 39.7 to 52.9% by vol. of an aqueous dispersion of thermoplastic and self-crosslinking acrylic polymers serving as vehicle and UV filter;

(III) 4.7 to 5.8% by vol. ethanol;

(IV) 20.6 to 21.7% by vol. water;

(V) 2.6 to 6.6% by vol. of a basic auxiliary;

(VI) 2.6 to 6.6% maple syrup;

the constituents (I) to (VI) adding to 100% by volume.

2. The colored liquid as set forth in claim 1, characterized by the base ink solution (I) containing 10 to 30% by weight of a humectant.

3. The colored liquid as set forth in claim 1, characterized by the base ink solution (I) containing 0.5% by weight of a stabilizer.

4. The colored liquid as set forth claim 1, characterized by it having a viscosity of less than 4 mPas at 25° C. and a surface tension of approx. 30 mN/cm at 25° C.

5. The colored liquid as set forth in claim 1, characterized by it having a viscosity of 10 to 20 Pas at 20° C. and a surface tension of 40 mN/m at 20° C.

6. The colored liquid as set forth in claim 5, characterized by it containing further thickeners selected from the group consisting of polivinyl pyrrolidone and polyacryl compounds.

7. The colored liquid as set forth in claim 1, characterized by it containing 2.6 to 6.6% by vol. of an aqueous solution of a salt selected from the group consisting of sodium hydrogen carbonate, sodium carbonate and potassium carbonate.

8. The colored liquid as set forth in claim 7, the aqueous solution comprising 70% by weight of sodium hydrogen carbonate.

9. The colored liquid as set forth in claim 7, characterized by the base ink (I) containing 10 to 30% by weight of a humectant.

10. The colored liquid as set forth in claim 1, the dispersion having a solids content in the range 49–51 weight %.

11. The colored liquid as set forth in claim 1, the dispersion having an anionic emulsifier system.

* * * * *

UNITED STATES PATENT AND TRADEMARK OFFICE
CERTIFICATE OF CORRECTION

PATENT NO.     : 6,423,763 B1
DATED          : July 23, 2002
INVENTOR(S)    : Ulrich Blasi It is certified that error appears in the above-identified patent and that said Letters Patent is hereby corrected as shown below:

<u>Title page,</u>
Item [30], Foreign Application Priority Data, the serial No. should read
-- 198 78 273.6 --

Signed and Sealed this

First Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,423,763 B1                                              Page 1 of 1
DATED         : July 23, 2002
INVENTOR(S)   : Ulrich Blasi It is certified that error appears in the above-identified patent and that said Letters Patent is hereby corrected as shown below:

<u>Title page,</u>
Item [30], Foreign Application Priority Data, the serial No. should read
-- 198 48 273.6 --

This certificate supersedes Certificate of Correction issued April 1, 2003.

Signed and Sealed this

Twenty-fourth Day of June, 2003

JAMES E. ROGAN
*Director of the United States Patent and Trademark Office*